United States Patent
Holzhueter et al.

(10) Patent No.: US 8,851,549 B2
(45) Date of Patent: Oct. 7, 2014

(54) STOWABLE VEHICLE SEAT

(75) Inventors: Walter W. Holzhueter, Southgate, MI (US); Todd C. McCann, Davison, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 15 days.

(21) Appl. No.: 13/369,656

(22) Filed: Feb. 9, 2012

(65) Prior Publication Data

US 2013/0207411 A1    Aug. 15, 2013

(51) Int. Cl.
*B60N 2/30* (2006.01)
*B60N 2/36* (2006.01)

(52) U.S. Cl.
CPC .............. *B60N 2/3011* (2013.01); *B60N 2/305* (2013.01)
USPC .......................................... 296/65.09; 296/69

(58) Field of Classification Search
CPC ............................ B60N 2/3011; B60N 2/305
USPC ...................... 296/65.09, 65.01, 69
See application file for complete search history.

(56) References Cited

U.S. PATENT DOCUMENTS

| | | |
|---|---|---|
| 364,011 A | 5/1887 | Hale |
| 417,823 A | 12/1889 | Hale |
| 491,761 A | 2/1893 | Aze et al. |
| 512,539 A | 12/1893 | Cushing |
| 566,675 A | 8/1896 | Forney |
| 613,423 A | 11/1898 | Pickles |
| 615,227 A | 11/1898 | Pickles |
| 675,367 A | 12/1900 | Gilfillan |
| 679,081 A | 7/1901 | Koehler |
| 717,208 A | 12/1902 | Janson |
| 725,996 A | 4/1903 | Siegel |
| 730,853 A | 6/1903 | Kohout |
| 751,277 A | 2/1904 | Frederick |
| 795,501 A | 7/1905 | Fassett |
| 805,802 A | 11/1905 | Kohout |
| 808,905 A | 1/1906 | Curwen |
| 809,084 A | 1/1906 | Bennett et al. |
| 814,514 A | 3/1906 | Budd |
| 830,410 A | 9/1906 | Budd et al. |
| 842,298 A | 1/1907 | Budd et al. |

(Continued)

FOREIGN PATENT DOCUMENTS

| | | |
|---|---|---|
| CH | 287456 | 11/1952 |
| DE | 4336710 | 4/1994 |

(Continued)

*Primary Examiner* — Glenn Dayoan
*Assistant Examiner* — Melissa A Black
(74) *Attorney, Agent, or Firm* — Ralph E Smith

(57) ABSTRACT

A stowable seat can include a seat back having an upper end, an opposite lower end and a seating side, a seat bottom having a forward end, a rearward end and a seating side, and a linkage arrangement. The linkage arrangement can include a first member pivotably coupled to the seat bottom and a vehicle support structure, a second member pivotably coupled to the seat bottom and the support structure, a third member fixed to the seat back and pivotably coupled to the support structure, and a fourth member pivotably coupled to the second member and the third member. The linkage arrangement can facilitate suspending the seat bottom in a seating position from the support structure in spaced relation to the floor; rotating the seat bottom to a stadium position; and rotating the seat back and articulating the seat bottom to a stowed position.

20 Claims, 7 Drawing Sheets

(56) References Cited

U.S. PATENT DOCUMENTS

| | | |
|---|---|---|
| 848,201 A | 3/1907 | Pickles |
| 935,242 A | 9/1909 | Witte |
| 1,140,097 A | 5/1915 | Anger |
| 1,140,342 A | 5/1915 | Anger |
| 1,169,727 A | 1/1916 | Lang |
| 1,169,728 A | 1/1916 | Lang |
| 1,196,902 A | 9/1916 | Thompson |
| 1,196,908 A | 9/1916 | Walker |
| 1,214,124 A | 1/1917 | Bennett |
| 1,231,205 A | 6/1917 | Schechter |
| 1,240,244 A | 9/1917 | Ogle |
| 1,252,748 A | 1/1918 | Walker |
| 1,298,823 A | 4/1919 | Taylor |
| 1,301,020 A | 4/1919 | Walker |
| 1,360,966 A | 11/1920 | Marsh |
| 1,412,139 A | 4/1922 | Schechter |
| 1,488,659 A | 4/1924 | Abel et al. |
| 1,782,231 A | 11/1930 | Cross et al. |
| 1,968,434 A | 7/1934 | Bell |
| 2,726,708 A | 12/1955 | Eckhorn et al. |
| 3,265,435 A | 8/1966 | Bilancia |
| 3,313,570 A | 4/1967 | McVeigh |
| 3,877,746 A | 4/1975 | Christine et al. |
| 4,081,051 A | 3/1978 | Logsdon |
| 4,322,052 A | 3/1982 | Hodge et al. |
| 4,407,542 A | 10/1983 | Kehl et al. |
| 4,699,418 A * | 10/1987 | Plavetich ............... 296/65.09 |
| 4,840,427 A | 6/1989 | Hong |
| 5,076,640 A | 12/1991 | Bulte |
| 5,322,341 A | 6/1994 | Harrison et al. |
| 5,362,124 A | 11/1994 | Schlidt |
| 6,179,375 B1 | 1/2001 | Lane |
| 6,715,825 B2 | 4/2004 | Tame |
| 6,869,138 B2 | 3/2005 | Rhodes et al. |
| 6,955,386 B2 | 10/2005 | Rhodes et al. |
| 6,962,384 B2 | 11/2005 | Rhodes et al. |
| 7,066,519 B2 | 6/2006 | Rhodes et al. |
| 7,077,451 B2 | 7/2006 | Rhodes et al. |
| 7,188,883 B2 | 3/2007 | Van Dyk et al. |
| 7,255,384 B2 * | 8/2007 | Saberan et al. ............ 296/65.09 |
| 7,377,571 B2 | 5/2008 | Ewers et al. |
| 2008/0224524 A1 | 9/2008 | Mather et al. |

FOREIGN PATENT DOCUMENTS

| | | |
|---|---|---|
| GB | 318676 | 9/1929 |
| GB | 699609 | 11/1953 |
| WO | 01/70537 | 9/2001 |

* cited by examiner

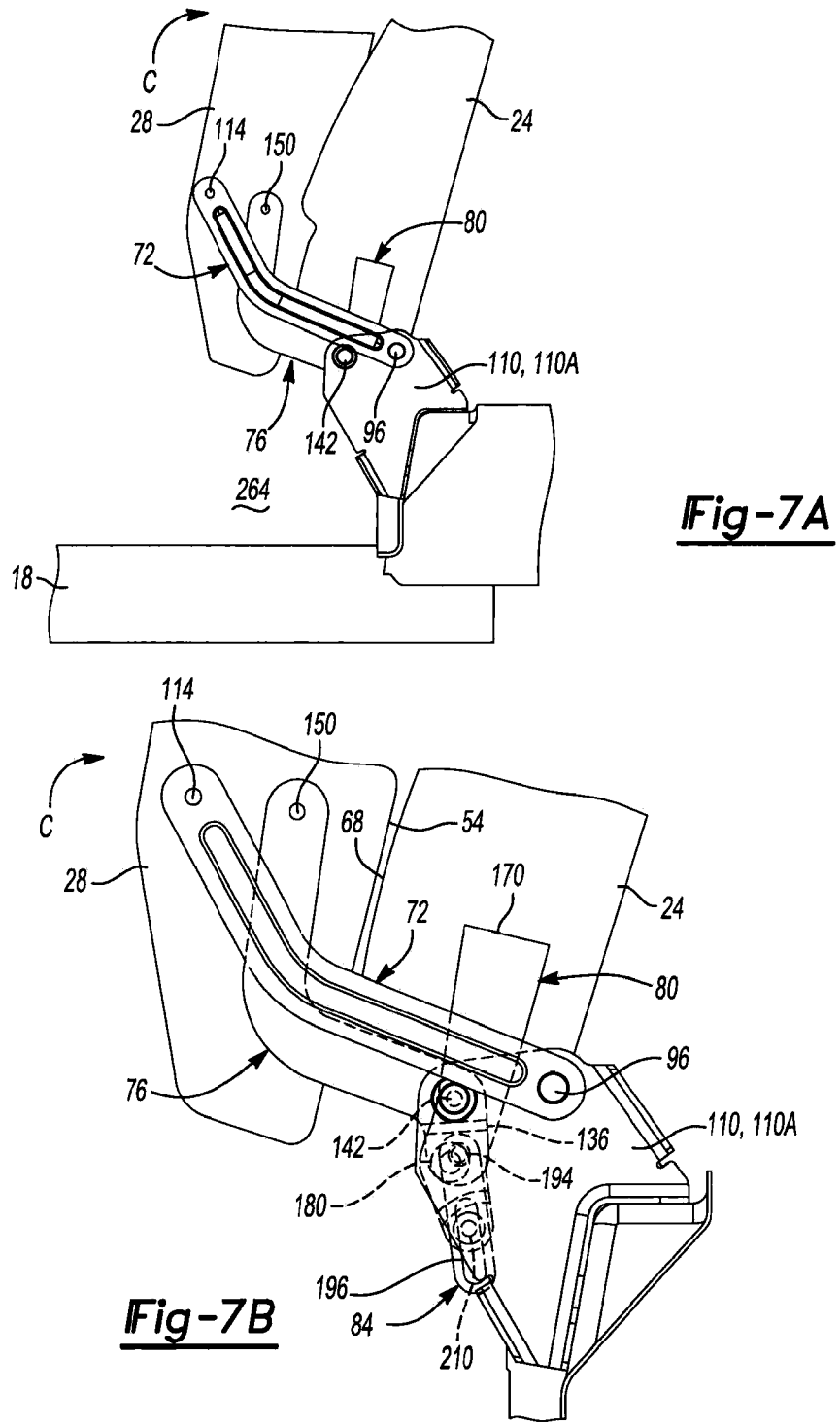

STOWABLE VEHICLE SEAT

FIELD

The present disclosure relates generally to a seat for a vehicle and, more particularly, to a stowable vehicle seat.

BACKGROUND

In motor vehicles such as vans, mini-vans and sport utility vehicles, it is desirable that passenger seating arrangements be optionally stowable on-board the vehicle when not in use to provide additional or improved storage capacity for carrying cargo. One potential solution to this desire for additional storage capacity is a seat assembly that is capable of being stowed to provide a flat or relatively flat load floor. One drawback of the current stowable seat assemblies is the complexity of the arrangements utilized to facilitate stowage of such seats. Another drawback of the current stowable seat assemblies is a need for the seats to be turned or flipped upside down such that a seating side of the seat bottom is facing a floor of a stowage tub in order to stow the seat assembly. To deploy the stowed seat, a user will then typically need to rotate the seat in an opposite manner from the stowed position in the stowage tub.

Thus, while stowable seat assemblies have generally worked for their intended purpose, there remains a need for continuous improvement in the relevant art.

SUMMARY

In one form, a stowable seat arrangement for a vehicle having a floor is provided in accordance with the present teachings. The stowable seat can include a seat back, a seat bottom and a linkage arrangement. The seat back can have an upper end, an opposite lower end and a seating side. The seat bottom can have a forward end, a rearward end and a seating side. The linkage arrangement can include a first member pivotably coupled to the seat bottom and a vehicle support structure, a second member pivotably coupled to the seat bottom and the support structure, a third member fixed to the seat back and pivotably coupled to the support structure, and a fourth member pivotably coupled to the second member and the third member. The linkage arrangement can be configured to facilitate suspending the seat bottom in a deployed or seating position from the vehicle support structure in spaced relation to the floor; rotating the seat bottom to a stadium position substantially parallel to the seat back; and rotating the seat back and articulating the seat bottom to a stowed position whereby the seat bottom engages the floor.

In another form, a stowable seat arrangement for a vehicle having a floor is provided in accordance with the present teachings. The seat back can have an upper end, an opposite lower end and a seating side. The seat bottom can have a forward end, a rearward end, a seating side and an opposite lower side. The linkage arrangement can include a first member pivotably coupled to the seat bottom and a vehicle support structure via respective first and second couplings; a second member pivotably coupled to the seat bottom and the support structure via respective third and fourth couplings; a third member fixed to the seat back and pivotably coupled to the support structure via a fifth coupling; and a fourth member having a channel formed therein. The fourth member can be pivotably coupled to the second member via a sixth coupling and slidably and pivotably coupled to the third member via the channel and a seventh coupling. The linkage arrangement can be configured to facilitate suspending the seat bottom in a deployed or seating position from the vehicle support structure in spaced relation to the floor; rotating the seat bottom to a stadium position substantially parallel to the seat back; and rotating the seat back and articulating the seat bottom to a stowed position whereby the seat bottom engages the floor and the seat back engages the seat bottom. The vehicle support structure can be positioned proximate the lower end of the seat back and the rearward end of the seat bottom so as to provide unobstructed access between the underside of the seat bottom and the floor when the stowable seat is in the deployed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 7A is a side view of the stowable seat and linkage arrangement in a stadium position in accordance with the present teachings; and FIG. 7B is an enlarged partial side view of the linkage arrangement of the stowable seat of FIG. 7A in accordance with the present teachings.

DETAILED DESCRIPTION

Figure 1:
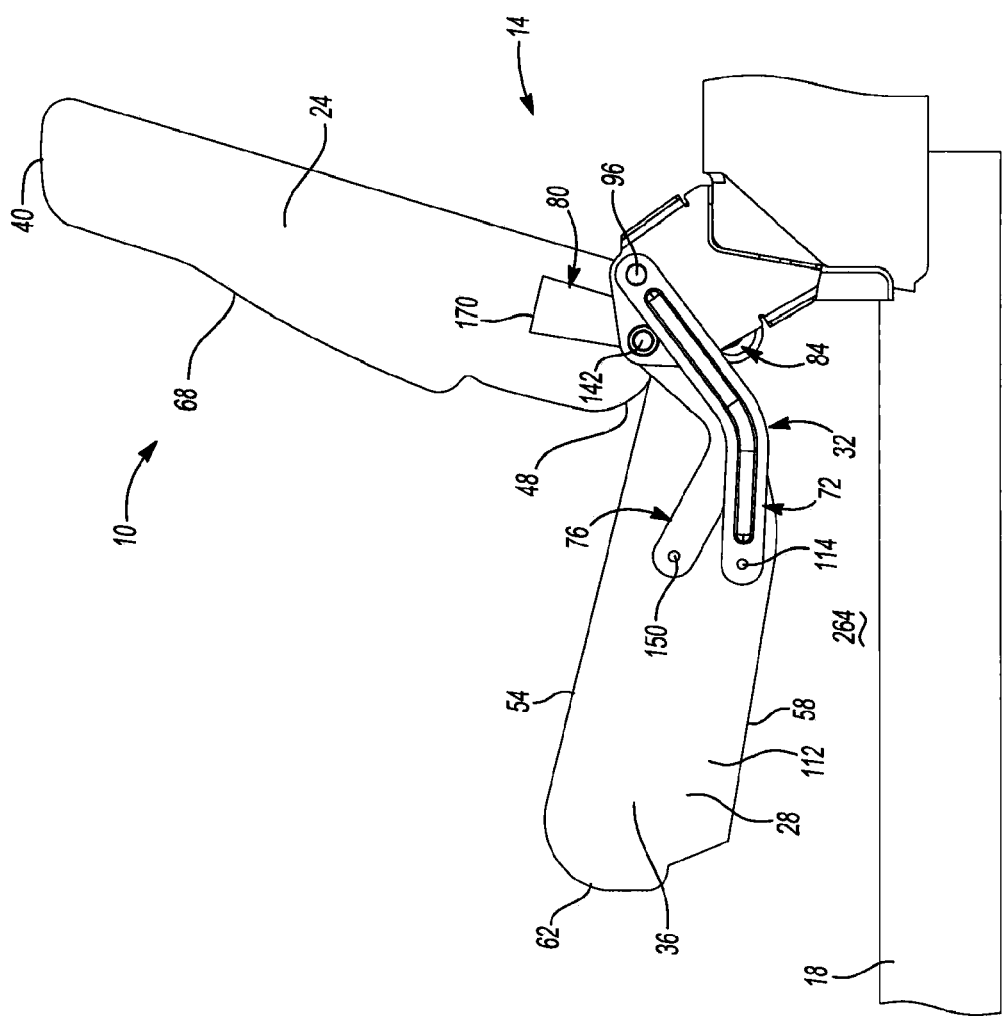
FIG. 1 is a side view of a stowable seat operatively associated with a partially shown exemplary vehicle in accordance with the present teachings.

With initial reference to FIG. 1, a stowable seat 10 is provided for a motor vehicle in accordance with the present teachings. As shown, the stowable seat 10 may be for a second row of seating 14 for the vehicle and, while only one stowable seat 10 is shown in the various views of the drawings, it will be appreciated that stowable seat 10 can include a pair of outboard stowable seats 10 in a spaced apart side-by-side configuration. The stowable seats 10, while discussed herein for a second row of seating in the vehicle, can also be for a third row of seating (not specifically shown). It will be appreciated that while the following discussion will continue with reference to one of the outboard stowable seats 10 (e.g., a driver side stowable seat 10), the discussion is applicable to both the passenger and driver side outboard seats 10, as well as for a center seat assembly (not shown) optionally positioned between the spaced apart outboard seat assemblies and/or for third row seating arrangements.

As will be discussed in greater detail below, each stowable seat 10 can be efficiently positioned in various configurations that provide for increased access, load floor storage and seating. In addition, a four-bar linkage can provide for efficient single-step positioning of stowable seat 10 in and/or between the various configurations. Further, stowable seat 10 can operate without support braces or legs extending from a seat bottom of stowable seat 10 to a floor 18 of the vehicle, as will be discussed herein.

Figure 5:
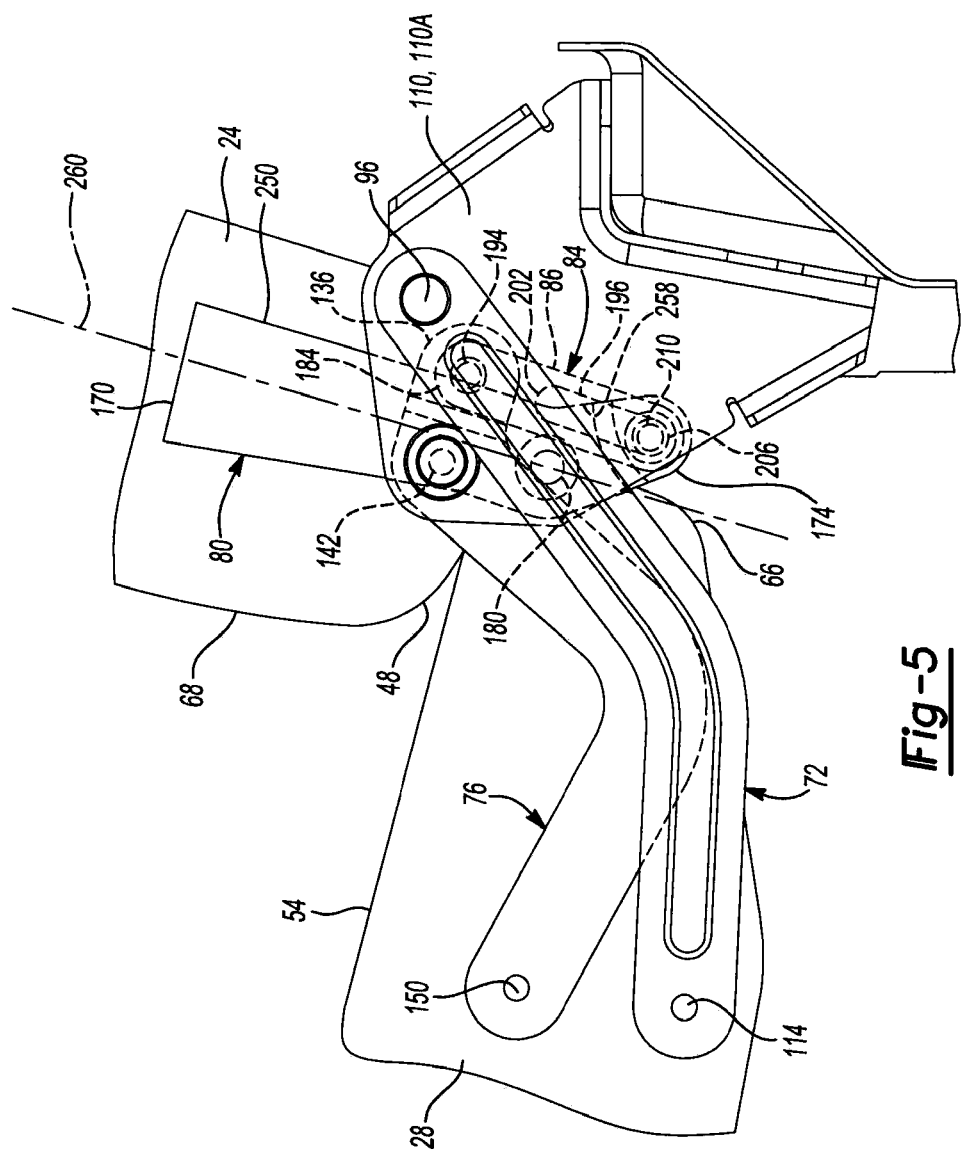
FIG. 5 is a partial side view of the stowable seat and linkage arrangement in a deployed position in accordance with the present teachings.

With continued reference to FIG. 1, stowable seat 10 can include a seat back 24, a cushion or seat bottom 28 and a linkage arrangement 32 on both a first or outboard side 36 of stowable seat 10 and on an opposite second or inboard side (not shown) of seat 10. In this regard, it will be appreciated that while the discussion will continue with reference to linkage arrangement 32 shown on the outboard side 36, the linkage arrangement 32 on the inboard side can include the same components and operation, as will be discussed herein. Seat back 24 can include an upper end 40 and an opposite lower end 48 and, while not shown, can also include an armrest and a head rest. In one exemplary configuration, seat back 24 can be locked in the deployed or seating position (FIG. 1) independent of the linkage arrangement 32. Seat bottom 28 can include an upper or seating side 54, an opposite lower or under side 58, a first or forward end 62 and an opposite second or rearward end 66 (FIG. 5). Similarly, seat back 24 can include a seating side 68.

Figure 2:
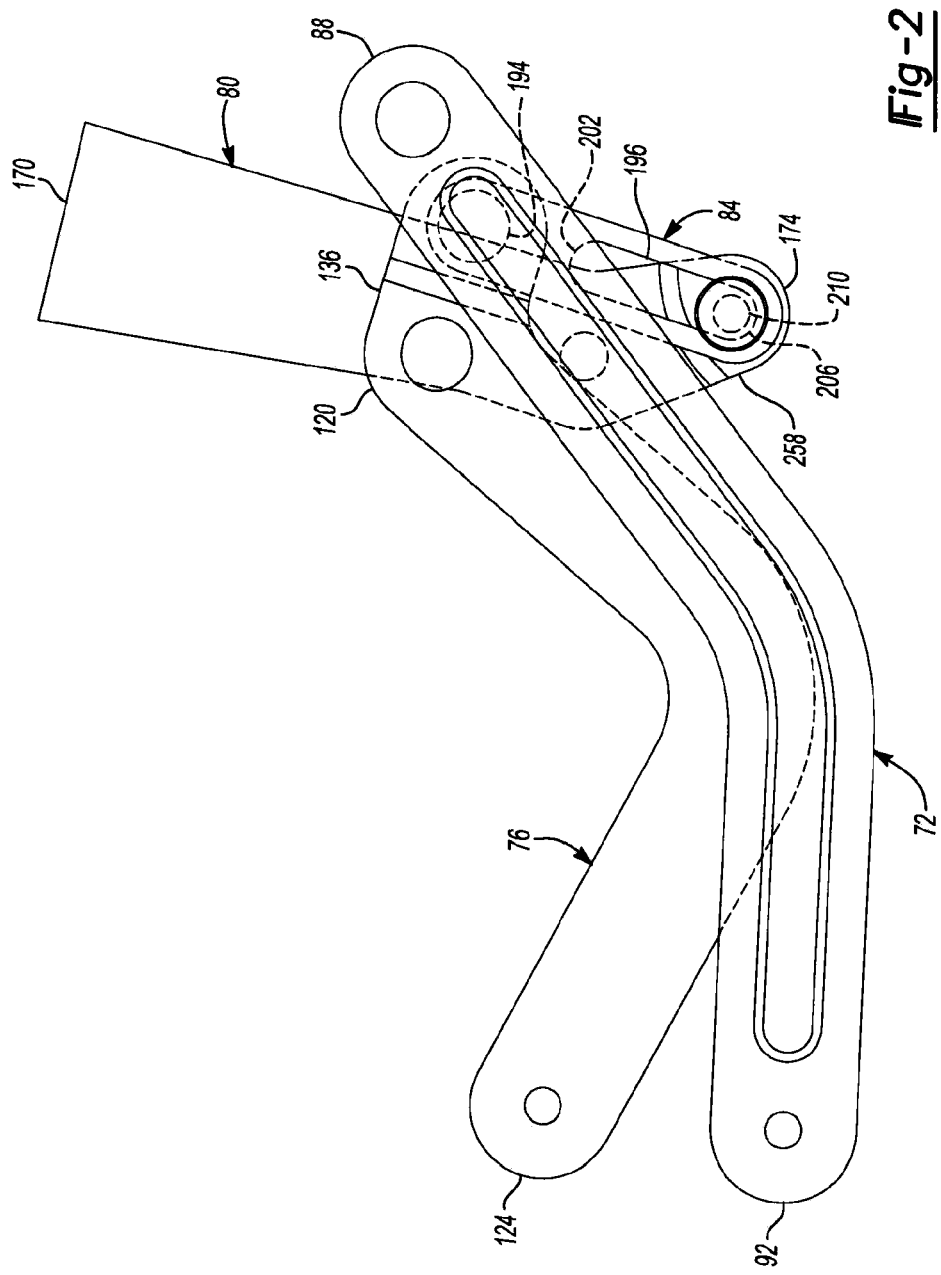
FIG. 2 is a view of a linkage arrangement operatively associated with the stowable seat and shown in a deployed position viewed from an outboard side of the stowable seat in accordance with the present teachings.
Figure 3:
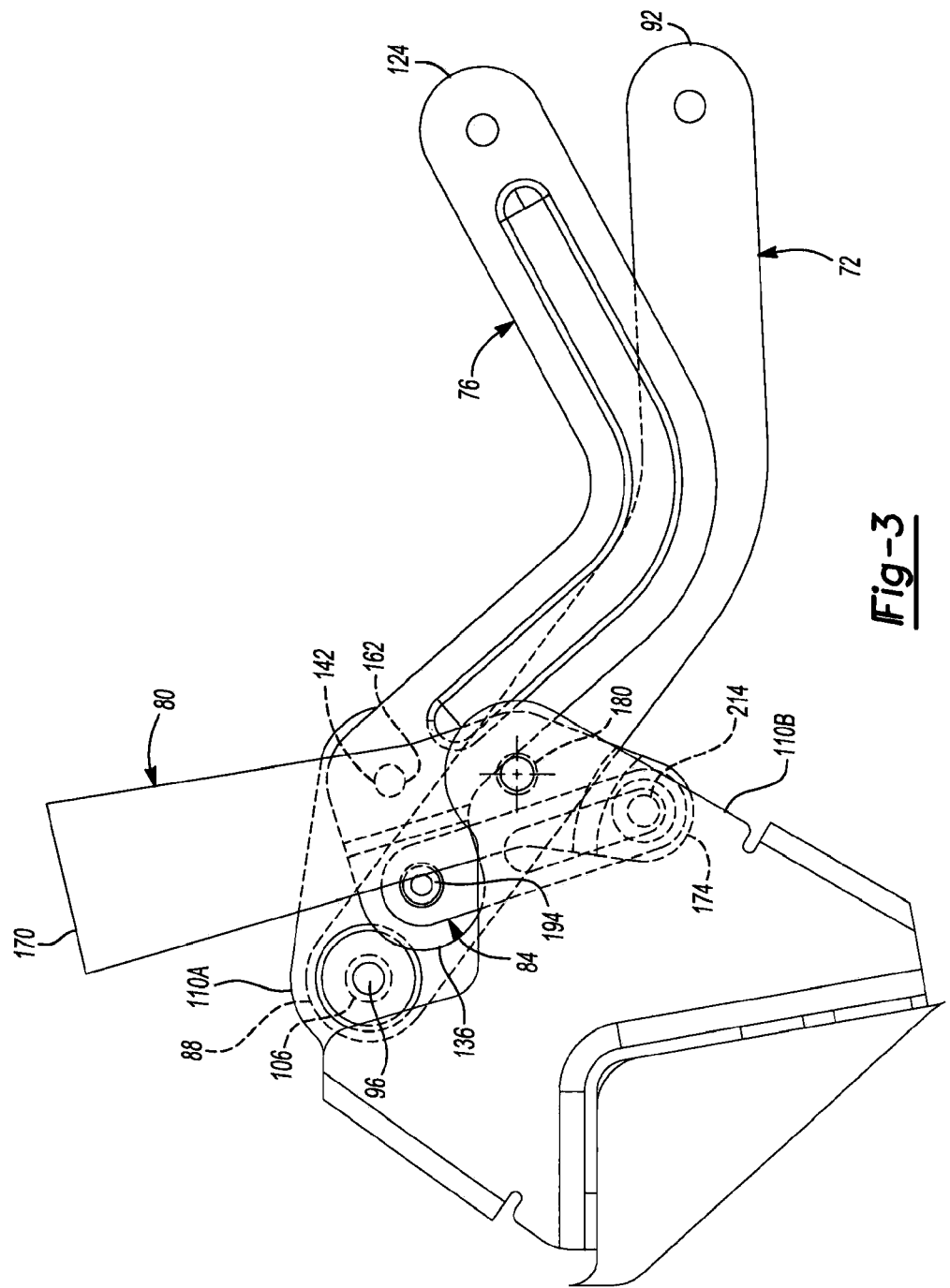
FIG. 3 is a view of the linkage arrangement viewed from an inboard side of the stowable seat in accordance with the present teachings.
Figure 4:
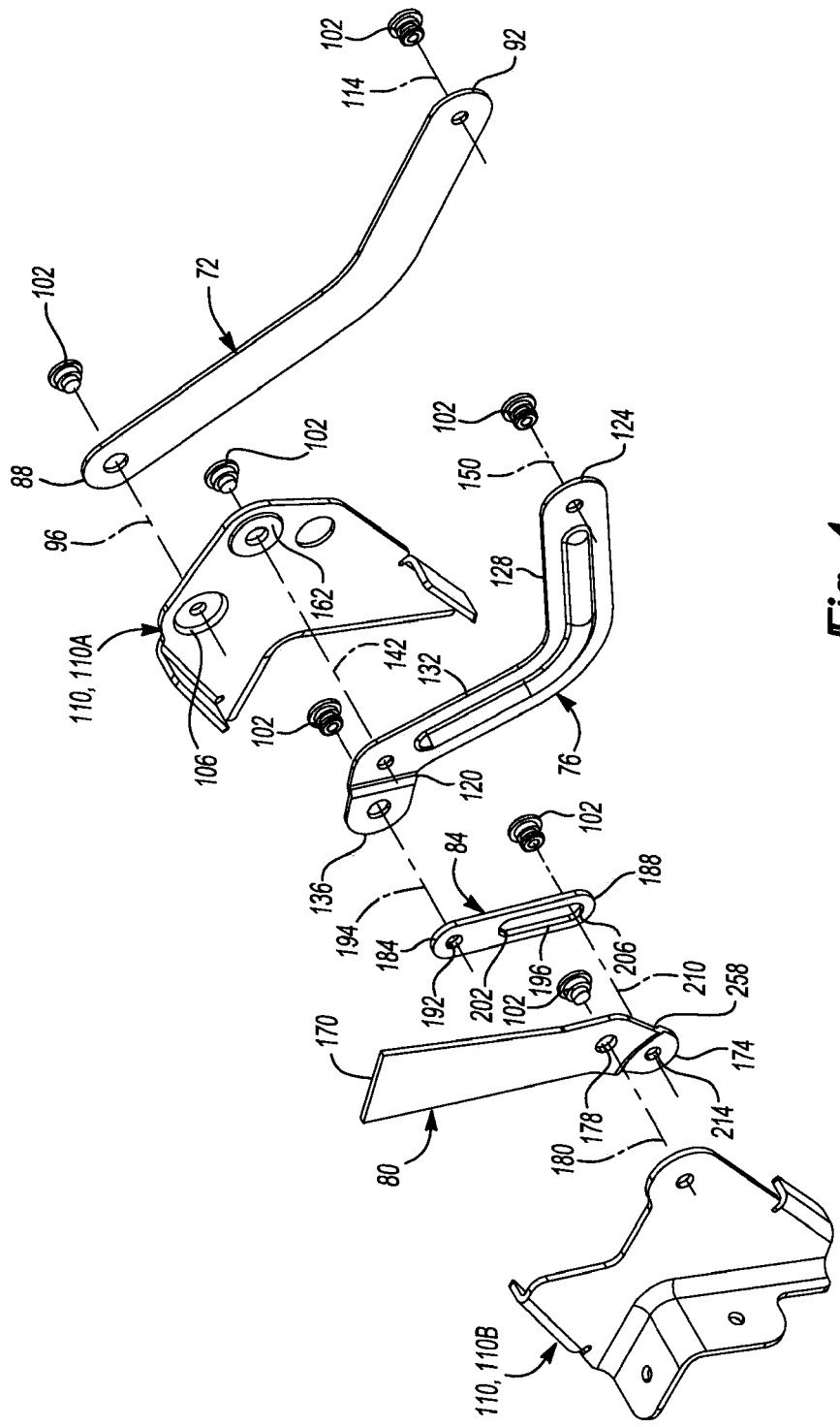
FIG. 4 is an exploded view of the linkage arrangement in accordance with the present teachings.

With additional reference to FIGS. 2-4, the linkage arrangement 32 can include a first or outboard member 72, a second or inboard member 76, a third or seat back member 80 and a fourth or link member 84. The outboard member 72 can include a first end 88 and a second opposite end 92. First end 88 can be pivotably coupled 96 (FIG. 1) via a fastener 102 at a first location 106 to a bracket or support structure 110 attached to the vehicle floor 18. It should be appreciated that support structure 110 can be integrally formed with or separate from and attached to floor 18. Similarly, support structure 110 can be a unitary component or can be formed as two separate members 110A and 110B, as shown in the various views of the drawings. In the exemplary configuration illustrated, support structure 110 can be positioned proximate the lower end 48 of seat back 24 and the rearward end 66 of seat bottom 28. Second end 92 of outboard member 72 can be pivotably coupled 114 (FIG. 1) via another fastener 102 to a side 112 of seat bottom 28, as shown for example in FIG. 1 with reference to FIG. 4. As can be seen in FIGS. 1-4, outboard member 72 can include a V-shaped configuration defining an obtuse angle between the first and second ends 88, 92.

Inboard member 76 can similarly include a first end 120, a second opposite end 124, and first and second portions 128, 132 positioned substantially perpendicular to each other, as shown for example in FIG. 2. It will be appreciated, however, that other angular orientations of portions 128, 132 are contemplated herein. An extension portion or member 136 can extend from the second end 124 to facilitate pivotably coupling the inboard member 76 to the link member 84, as will be discussed in greater detail below. The first end 120 can be pivotably coupled 142 via another fastener 102 to support structure 110 and the second end 124 can be pivotably coupled 150 via another fastener 102 to the side 112 of seat bottom 28. In the exemplary configuration shown in the figures, first end 120 of inboard member 76 can be coupled to a first side 154 of support structure member 110A and the first end 88 of outboard member 72 can be coupled to a second opposite side 158 of member 110A. The first end 120 can be pivotably coupled 142 (FIG. 3) to member 110A at a second location 162 forward of the first location 106, as shown for example in FIGS. 1-3. In one exemplary configuration, the inboard member 76 can include an L-shaped configuration with extension member 136 extending at an acute angle therefrom.

The seat back member 80 can include a first or upper end 170 and a second or opposite end 174. The first end 170 can be fixed to seat back 24 about a side thereof so as to move with seat back 24, as shown for example in FIG. 1. The second end 174 can include a first aperture 178 for pivotably coupling 180 (FIG. 3) second end 174 via another fastener 102 to support structure 110, such as member 110B, as shown for example in FIGS. 3 and 4. In this regard, seat back 24 can pivot relative to support structure 110 via pivotable coupling 180, as will be discussed in greater detail below.

The link member 84 can include a first end 184 and a second opposite end 188, as shown for example in FIG. 4. First end 184 can include an aperture 192 configured to receive another fastener 102 for pivotably coupling 194 the first end 184 of link member 84 to the extension portion 136 of second member 76, as also shown for example in FIGS. 3 and 4. Link member 84 can also include an axially extending slot or channel 196 extending from the second end 188 partially toward the first end 184, while stopping before aperture 192. The channel 196 can include a first end 202 and a second opposite end 206. The link member 84 can also be coupled 210 (e.g., FIGS. 2 and 4) to the second end 174 of seat back member 80 via another fastener 102 and a second aperture 214 (e.g., FIG. 4). In this regard, link member 84 can both pivot about coupling 210 as well as translate along coupling 210 via channel 196. As will be discussed in greater detail below, link member 84 can be configured to facilitate cooperation between members of the linkage arrangement 32 to provide for the single-step positioning of stowable seat 10 in the deployed, stowed and stadium positions.

In the exemplary configuration illustrated among the various views of the figures, the link member 84 can be positioned between the seat back member 80 and the inboard member 76. It will be appreciated, however, that the members of linkage arrangement 32 can be positioned in various orders or configurations relative to each other and the unitary or multiple member support structure 110. As can also be seen in the figures, the linkage arrangement 32 and, in particular, the inboard and outboard members 72, 76, can couple the seat bottom 28 to the support structure 110 independent of the seat back 24.

With additional reference to FIGS. 5-7B and continued reference to FIGS. 1-4, operation of the stowable seat 10 and associated linkage arrangement 32 will now be discussed. Referring initially to FIG. 5, the stowable seat 10 is shown in the deployed or seating position. As can be seen, the linkage arrangement 32 in cooperation with the seat back 24, seat bottom 28 and support structure 110 suspends the seat bottom 28 in the seating position without requiring legs or other support members extending from the underside 58 of the seat bottom 28 to the vehicle floor 18. This can provide for, among other things, easy and unobstructed access to under-seat storage when stowable seat 10 is in the deployed position.

In this deployed position, seat back 24 is in the upright or seating position, which can position the seat back member 80 in an upright or substantially vertical position 250, as shown for example in FIG. 5. The link member 84 can thus similarly be positioned in an upright position 86 as a result of the position of seat back 24 and the extended portion 136 coupled to the first end 184 of link member 84, as also shown in FIG. 5. In the exemplary configuration shown in FIG. 5, the seat back member 80 can also include an angled portion 258 at its second end 174, which can position the coupling 210 behind a longitudinal centerline 262 of seat back 24. This arrangement can assist in maintaining the relative positions of the seat back 24 and seat bottom 28 in the deployed seating position.

Further, cooperation of the inboard member 76 with the support structure 110 and link member 84 can maintain the seat bottom 28 in the seating position and support a load placed on seat bottom 28, such as a passenger. In the exemplary configuration shown in FIG. 5, when a load is placed on seat bottom 28, the inboard member 76 can pivot about pivotable coupling 142 to support structure 110 and thus draw link member 84 upward about coupling 210. In particular, by having the pivotable coupling 194 on extension member 136, the extension member 136 can act as a lever arm when inboard member 76 is rotated about pivotable coupling 142 thereby drawing link member 84 upward about coupling 210. For the configuration shown in FIG. 5, the second end 206 of channel 196 can rest against coupling 210 and act as a stop to limit the downward travel of seat bottom 28 relative to seat back 24 and floor 18. Thus, in the deployed position of stowable seat 10, link member 84 can be drawn upward by the inboard member 76 until the coupling 210 engages the second end 206 of channel 196, thereby stopping the downward travel of seat bottom 28 and establishing the deployed or seating position of seat bottom 28. This action can place the link member 84 in tension.

As discussed above, seat bottom 28 can be maintained in a predetermined seating position relative to seat back 24 based on cooperation of the members of linkage arrangement 32 and, in particular, a length of link member 84. In this regard, a length of the channel 196 can play a role in the seating position of seat bottom 28 relative to seat back 24. For example, making the link member 84 longer can provide for having the seat bottom 28 being in a lowered position closer to the floor 18 when in the seating position.

Figure 6A:
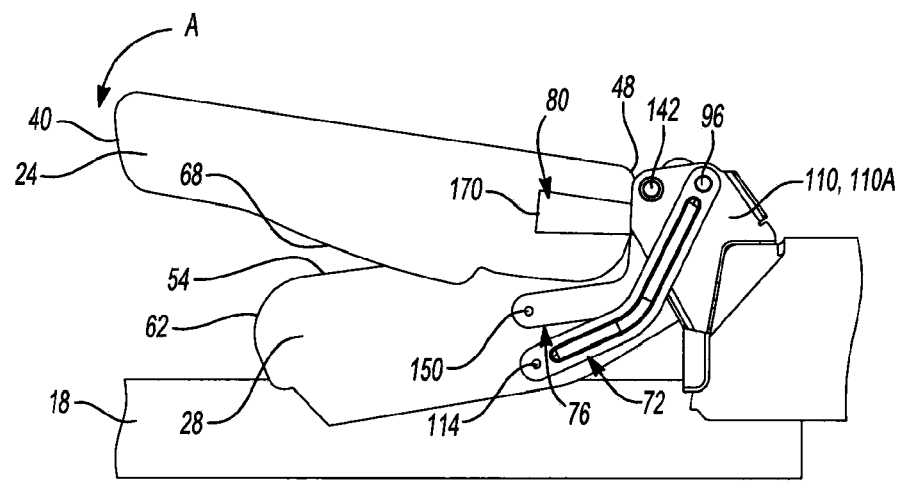
FIG. 6A is a side view of the stowable seat and linkage arrangement in a stowed position in accordance with the present teachings.
Figure 6B:
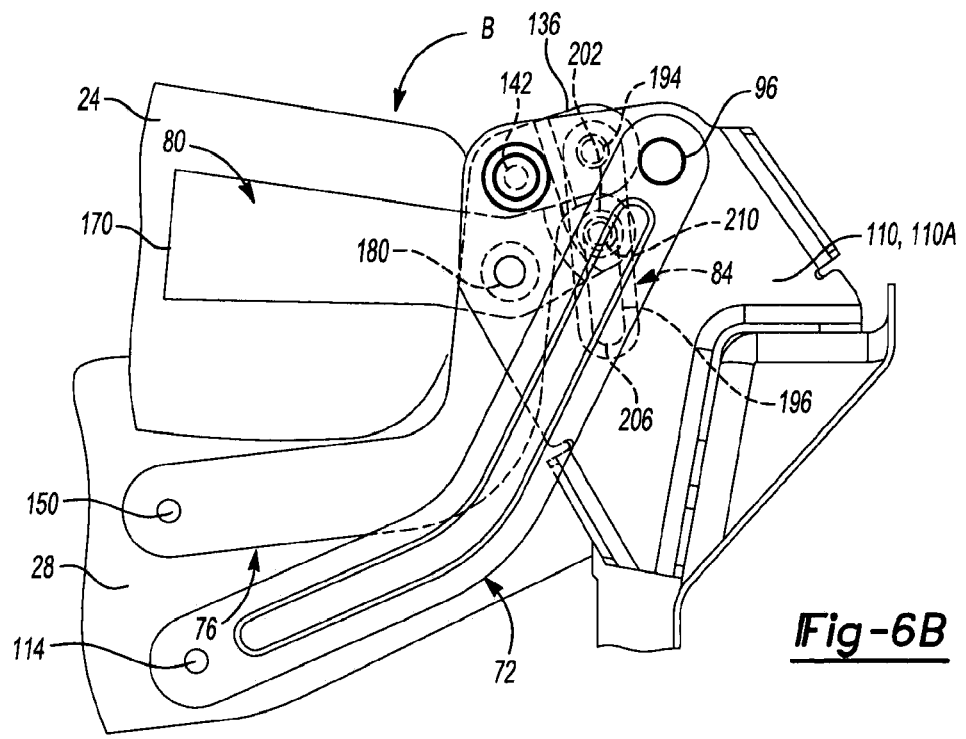
FIG. 6B is an enlarged partial side view of the linkage arrangement of the stowable seat of FIG. 6A in accordance with the present teachings.

To position the stowable seat 10 in the stowed position, the seat back 24 can be pivoted forward and downward, which can automatically articulate the seat bottom 28 downward, as can be generally seen in FIGS. 6A-6B. In the stowed position, the seat bottom 28 can be positioned lower in the vehicle relative to the seating or deployed position shown in FIG. 1. In one exemplary configuration, the seat bottom 28 can rest on the vehicle floor 18 in the stowed position and the seating side 68 of seat back 24 can rest against the seating side 54 of seat bottom 28.

In pivoting the seat back 24 forward and downward in the direction of arrow A of FIG. 6A, the seat back member 80 can be pivoted about pivotable coupling 180, which can raise or move upward coupling 210 associated with second end 174 of seat back member 80. This can, in turn, allow for inboard member 76 to pivot about pivotable coupling 142 under the weight of seat bottom 28, which can raise or move upward link member 84. As discussed above, link member 84 can be constrained from upward movement by coupling 210 when seat back 24 (and thus seat back member 80) are in the deployed position shown in FIG. 1. When the seat back 24 is pivoted downward to the position shown in FIG. 6A, the pivotable coupling 210 is raised, which allows for link member 84 to move upward and thus inboard member 76 to pivot downward in the direction of arrow B until seat bottom 28 rests on floor 18. Outboard member 72 can pivot about couplings 96 and 114 during the articulation of seat bottom 28 to the stowed position.

In the exemplary configuration illustrated, seat bottom 28 can rest on floor 18 before seat back 24 has been fully rotated downward to rest on seat bottom 28. In this regard, the remaining downward pivoting of seat back 24 can move coupling 210 (i.e., fastener 102) in channel 196 of link member 84 in a lost motion fashion. In particular, seat back member 80 can move fastener 102 forming part of coupling 210 upward in channel 196 without or substantially without further movement of link member 84. During this lost motion movement of coupling 210, the inboard and outboard members 72, 76 and seat bottom 28 can remain in the same position, namely the stowed position. In one exemplary configuration, the coupling 210 can engage the upper end 202 of channel 196 when seat back 24 reaches the stowed position resting on seat bottom 28. This can serve as a stop mechanism to prevent further downward pivoting of seat back 24 together with or independent of seat back 24 engaging seat bottom 28.

Stowable seat 10 can be articulated from the stowed position of FIGS. 6A-6B to the deployed position shown in FIG. 1 by generally reversing the process discussed immediately above for stowing seat 10. In particular, seat back 24 can be pivotably raised toward the deployed position shown in FIG. 1 by rotating seat back 24 about pivotable coupling 180 in a direction opposite of arrow A (FIG. 6A). During this rotation, seat back member 80 can move coupling 210 in a lost motion fashion within channel 196 of link member 84 until coupling 210 engages the second end 206 of channel 196. At this point, continued rotation of seat back 24 to the deployed position can draw link member 84 downward (via coupling 210), which in turn can rotate inboard member 76 clockwise about pivotable coupling 142. Such clockwise rotation of inboard member 76 can raise seat bottom 28 to the deployed position. From the above discussion, it will be appreciated that seat back 24 can also be used to automatically move seat bottom 28 from the stowed position to the deployed position.

With particular reference to FIGS. 7A-7B, and continued reference to FIGS. 1-6B, positioning of the stowable seat 10 to the stadium position shown in FIGS. 7A-7B will now be discussed in greater detail. The stadium position can provide for, among other things, increased cargo capacity in a space 264 traditionally occupied by seat bottom 28 being in the deployed position (FIG. 1).

In the exemplary configuration illustrated, seat bottom 28 can be pivoted upward and rearward in a direction of arrow C from the deployed position so that the seat bottom 28 is in a vertical or substantial vertical position with at least a portion of its seating side 54 in engagement with at least a portion of the seating side 68 of seat back 24. During this pivotal movement of seat bottom 28, seat back 24 can remain in its upright, deployed position, as shown in FIGS. 7A-7B.

Upon raising seat bottom 28 in the direction of arrow C, outboard member 72 of linkage arrangement 32 can pivot in the direction of arrow C about pivotable couplings 96 and 114, and inboard member 76 can pivot in the direction of arrow C about pivotable couplings 142 and 150. Upon inboard member 76 pivoting in the clockwise direction of arrow C about pivotable coupling 142, the extension member 136 can be rotated downward and forward in the clockwise direction from its deployed position shown in FIG. 1. Such rotation of extension member 136 can articulate link member 84 about pivotable coupling 194 and about coupling 210 in a lost motion fashion via channel 196. Seat bottom 28 can be maintained in the stadium position via springs (not shown) and/or a latch mechanism (not shown) and/or can be maintained in the stadium position based on the over-center rotation of a center of gravity of seat bottom 28.

It will be appreciated that movement of seat bottom 28 and/or seat back 24 in connection with the deployed, stowed and stadium positions can be performed manually or with a power assisted mechanism (not shown).

What is claimed is:

1. A stowable seat arrangement for a vehicle having a floor, comprising:
   a seat back having an upper end, an opposite lower end and a seating side;
   a seat bottom having a forward end, a rearward end and a seating side; and
   a linkage arrangement including a first member pivotably coupled to the seat bottom and a vehicle support structure, a second member pivotably coupled to the seat bottom and the support structure, a third member fixed to the seat back and pivotably coupled to the support structure, and a fourth member pivotably coupled to the second member and slidably and pivotably coupled to the third member;
   wherein the linkage arrangement is configured to facilitate suspending the seat bottom in a deployed or seating position from the vehicle support structure in spaced relation to the floor, rotating the seat bottom to a stadium position substantially parallel to the seat back, and rotating the seat back and articulating seat bottom to a stowed position whereby the seat bottom engages the floor.

2. The stowable seat of claim 1, wherein the first member is pivotably coupled to the seat bottom and support structure with respective first and second pivotable couplings, the second member is pivotably coupled to the seat bottom and support structure with respective third and fourth couplings, the third member is pivotably coupled to the support structure with a fifth coupling, and the fourth member is pivotably coupled to the second member with a sixth coupling and slidably and pivotably coupled to the third member with a seventh coupling.

3. The stowable seat of claim 2, wherein the fourth member includes a linking member defining a channel having a first end in a direction toward the sixth coupling and a second opposite end, the linking member coupled to the third member with the seventh coupling via the channel such that the seventh coupling facilitates the linking member pivoting and sliding relative to the third member.

4. The stowable seat of claim 3, wherein the second member includes an L-shaped configuration having the third and fourth pivotable couplings at respective ends thereof, and an extension portion extending at an acute angle from an end of the second member with the fourth coupling, the extension portion being pivotably coupled to the fourth member via the sixth coupling.

5. The stowable seat of claim 4, wherein when the stowable seat is in the deployed position, the seat bottom pivots the second member about the fourth pivotable coupling such that the extension portion via the sixth coupling draws the second end of the channel of the linking member into engagement with the seventh pivotable coupling so as to support the seat bottom in the seating position and prevent further downward rotation thereof toward the floor.

6. The stowable seat of claim 5, wherein the linking member is placed in tension between the sixth and seventh pivotable couplings when the seat bottom is in the deployed position.

7. The stowable seat of claim 4, wherein rotating the seat back toward the floor about the fifth pivotable coupling rotates the first and second members about the respective second and fourth couplings to the support structure so as to articulate the seat bottom to the stowed position in engagement with the floor.

8. The stowable seat of claim 7, wherein the seating side of the seat back is in engagement with the seating side of the seat bottom when the stowable seat is in the stowed position.

9. The stowable seat of claim 7, wherein rotating the seat back from the deployed position to the stowed position raises the seventh pivotable coupling in a direction away from the floor, which allows the linking member to raise and the second member to rotate about the fourth pivotable coupling in a direction toward the floor.

10. The stowable seat of claim 9, wherein during a portion of the rotation of the seat back from the deployed position to the stowed position, the third member slides the seventh pivotable coupling in the channel of the linking member in a direction from the second end to the first end of the channel without moving the linking member.

11. The stowable seat of claim 7, wherein the seventh pivotable coupling engages the first end of the channel of the linking member when the seat back and the seat bottom are in the stowed position thereby preventing further downward rotation of the seat back toward the floor.

12. The stowable seat of claim 7, wherein rotating the seat back from the deployed position to the stowed position automatically rotates and articulates the seat bottom from the deployed position to the stowed position via the linkage arrangement.

13. The stowable seat of claim 4, wherein rotating the seat bottom to the stadium position includes rotating the seat bottom in a direction away from the floor and toward the seat back such that the first member rotates about the first and second pivotable couplings and the second member rotates about the third and fourth pivotable couplings.

14. The stowable seat of claim 13, wherein the seating side of the seat bottom engages the seating side of the seat back when the stowable seat is in the stadium position, the seat back being in an upright seating position when the stowable seat is in the stadium position.

15. The stowable seat of claim 4, wherein the vehicle support structure includes first and second bracket members each fixed to the vehicle floor proximate the lower end of the seat back and the rearward end of the seat bottom.

16. The stowable seat of claim 15, wherein the first member is coupled to a first side of the first bracket member via the second coupling, the second member is coupled to a second opposite side of the first bracket member via the fourth coupling, and the third member is coupled to the second bracket member via the fifth coupling.

17. The stowable seat of claim 15, wherein the linkage arrangement facilitates suspending the seat bottom in spaced relation to the floor such that unobstructed access is provided between an underside of the seat bottom opposite the seating side and the floor when the seat bottom is in the deployed position.

18. A stowable seat arrangement for a vehicle having a floor, comprising:
   a seat back having an upper end, an opposite lower end and a seating side;
   a seat bottom having a forward end, a rearward end, a seating side and an opposite lower side; and
   a linkage arrangement including a first member pivotably coupled to the seat bottom and a vehicle support structure via respective first and second couplings, a second member pivotably coupled to the seat bottom and the support structure via respective third and fourth couplings, a third member fixed to the seat back and pivotably coupled to the support structure via a fifth coupling, and a fourth member having a channel formed therein, the fourth member pivotably coupled to the second member via a sixth coupling and slidably and pivotably coupled to the third member via the channel and a seventh coupling;

wherein the linkage arrangement is configured to facilitate suspending the seat bottom in a deployed or seating position from the vehicle support structure in spaced relation to the floor, rotating the seat bottom to a stadium position substantially parallel to the seat back, and rotating the seat back and articulating the seat bottom to a stowed position whereby the seat bottom engages the floor and the seat back engages the seat bottom, the vehicle support structure being positioned proximate the lower end of the seat back and the rearward end of the seat bottom so as to provide unobstructed access between the underside of the seat bottom and the floor when the stowable seat is in the deployed position.

19. The stowable seat of claim 18, wherein when the stowable seat is in the deployed position, the seat bottom pivots the second member about the fourth pivotable coupling such that the sixth pivotable coupling draws the second end of the channel of the linking member into engagement with the seventh pivotable coupling so as to support the seat bottom in the deployed position and prevent further downward rotation thereof toward the floor, the linking member being placed in tension between the sixth and seventh pivotable couplings when the seat bottom is in the deployed position.

20. The stowable seat of claim 18, wherein rotating the seat back toward the floor about the fifth pivotable coupling rotates the first and second members about the respective second and fourth pivotable couplings so as to articulate the seat bottom to the stowed position in engagement with the floor, the seating side of the seat back engaging the seating side of the seat bottom in the stowed position.

* * * * *